United States Patent
Wang et al.

(10) Patent No.: US 11,834,371 B2
(45) Date of Patent: Dec. 5, 2023

(54) METHOD FOR IMPROVING PERFORMANCE OF CONCRETE AGGREGATES

(71) Applicant: CHINA CONSTRUCTION INDUSTRIAL & ENERGY ENGINEERING GROUP CO.,LTD., Nanjing (CN)

(72) Inventors: Anhui Wang, Nanjing (CN); Qiwei Zhan, Nanjing (CN); Yanfang Zhang, Nanjing (CN); Jiaojiao Ni, Nanjing (CN); Zhanwei Huang, Nanjing (CN); Hao Chen, Nanjing (CN); Wanying Dong, Nanjing (CN); Changhao Fu, Nanjing (CN)

(73) Assignee: CHINA CONSTRUCTION INDUSTRIAL & ENERGY ENGINEERING GROUP CO., LTD., Nanjing (CN)

( * ) Notice: Subject to any disclaimer, the term of this patent is extended or adjusted under 35 U.S.C. 154(b) by 0 days.

(21) Appl. No.: 18/122,141

(22) Filed: Mar. 16, 2023

(65) Prior Publication Data
US 2023/0219845 A1 Jul. 13, 2023

(30) Foreign Application Priority Data
Mar. 31, 2022 (CN) .......................... 202210330160.7

(51) Int. Cl.
*C04B 18/167* (2023.01)
*C04B 20/02* (2006.01)
*C04B 103/00* (2006.01)

(52) U.S. Cl.
CPC .......... *C04B 18/167* (2013.01); *C04B 20/023* (2013.01); *C04B 2103/0001* (2013.01)

(58) Field of Classification Search
CPC ............... C04B 18/167; C04B 20/023; C04B 2103/0001
See application file for complete search history.

(56) References Cited

U.S. PATENT DOCUMENTS

2014/0371353 A1 12/2014 Mitchell et al.
2016/0376192 A1 12/2016 Mitchell et al.
2020/0094263 A1 3/2020 Ferrari et al.

OTHER PUBLICATIONS

Parashar et al., "Experimental study of the effect of bacillus megaterium bacteria on cement concrete" IOP Conf. Ser.: Mater. Sci. Eng. 1116 012168 (Year: 2021).*
Vijay et al. "Experimental Study on Bacterial Concrete Using Bacillus Subtilis Micro-Organism", Emerging Trends in Civil Engineering, Lecture Notes in Civil Engineering 61, https://doi.org/10.1007/978-981-15-1404-3_20. (Year: 2020).*

* cited by examiner

*Primary Examiner* — Anthony J Green
(74) *Attorney, Agent, or Firm* — Zhigang Ma

(57) ABSTRACT

The present disclosure discloses a method for improving the performance of concrete aggregates, comprising the following steps: (1) adding composite microbial powders, recycled aggregates and water into a stirring pot in a certain ratio to be continuously and uniformly stirred; (2) placing the recycled aggregate obtained in step (1) and another microbial powder in a vacuum device so as to fill the microbial powder into the cracks of the recycled aggregate in a negative-pressure environment; and (3) spraying a calcium source solution to the surface of the recycled aggregate obtained in step (2) at an interval of 5-6 hours for repeating 3-5 times to maintain the wet surface of the recycled aggregate.

9 Claims, 2 Drawing Sheets

METHOD FOR IMPROVING PERFORMANCE OF CONCRETE AGGREGATES

TECHNICAL FIELD

The present disclosure relates to a method for improving the performance of concrete, particularly to a method for improving the performance of concrete aggregates.

BACKGROUND

In recent years, with the rapid development of China's economy and the accelerated construction of large-scale urban infrastructures, the consumption of building materials, especially concrete, as the first choice and the largest material, has been increased rapidly. This means that the huge consumption of sands, cements and other resources will continue to cause irreversible damage to an ecological environment. Meanwhile, with the construction of large-scale infrastructures, a large number of building wastes such as waste concretes are produced. From 2006 to 2014, the construction area of buildings in China's building industry is increased exponentially, and the amount of the resulting building wastes should also increase exponentially. In 2015, the construction area of houses in China's building industry declined slightly, but remained basically the same as that in 2014. In 2015, 1.5 billion tons of building wastes were annually produced in China, and annually increased by 16%. At present, China's building waste has accounted for 30%-40% of the total urban wastes. It is estimated that about 30 billion square meters of building area will be newly added by 2020 in China, and the total amount of the resulting building wastes can be imagined. The building wastes mainly composed of waste concrete is increasing day by day, but the amount of waste concretes disposed each year is far less than its production. A surprising amount of discarded waste concretes takes up a lot of valuable land resources, which produces secondary pollution to the ecological environment so as to cause degradation of soil and water.

To alleviate the increasing shortage of raw material resources of cement concrete and solve a series of environmental and social problems caused by the rapid increase of waste concretes, it is urgent to recycle waste concretes. However, waste concretes come from different industries and regions, which is complex and changeable, and its quality is difficult to control. A company has demolished and built a sugar workshop. The concrete of the sewage treatment tank in the workshop has been soaked with residual sugar substances for many years, and there is a large amount of sugar substances in the concrete. The recycling of the concretes should fully consider the disposal of sugar substances, otherwise the performance of the recycled aggregates and recycled concrete will be seriously affected.

SUMMARY

The objective of the present disclosure is to provide a method for improving the performance of concrete aggregates with significantly reduced water absorption of recycled aggregates.

The technical solution: the present disclosure provides a method for improving the performance of concrete aggregates, comprising the following steps:

(1) setting a constant temperature, continuously stirring composite microbial powders, recycled aggregates and water, and then standing to obtain recycled aggregate A;

(2) washing the recycled aggregate A with deionized water, drying, placing the dried recycled aggregate A and another microbial powder in a vacuum device so as to fill the microbial powder into the cracks of the recycled aggregate in a negative-pressure environment to obtain recycled aggregate B; and (3) spraying a calcium source solution onto the surface of the recycled aggregate B to maintain the wet surface of the recycled aggregate, keeping an environment temperature constant, and then standing;

Preferably, in step (1), the composite microbial powder is a mixture of saccharomycetes and acetobacters, and a mass ratio of the saccharomycetes to the acetobacters is 1:1-1:3; a mass ratio of the composite microbial powder to water to the recycled aggregate is 1:(5-10):(5-15); the stirring time is 24-72 hours, and the stirring speed is 10-50 r/min, the constant temperature is 20-30° C., and the time of standing is 48-120 hours.

Preferably, in step (2), the microbial powder is *Bacillus mucilaginosus*; a mass ratio of the microbial powder to the recycled aggregate A is 1:10-1:15.

Preferably, in step (3), the calcium source solution is at least one of calcium chloride, calcium nitrate or calcium lactate, the spraying time interval of the calcium source solution is 5-6 hours, the repetition times of spraying is 3-5 times, and the time of standing is 48-120 hours.

For treatment of carbohydrates mixed in recycled concretes and performance improvement of recycled aggregates, polysaccharides are degraded into small molecular substances through micro-biological degradation and converted into acidic substances, and a mortar layer on the surface of the recycled aggregate is peeled off to reduce the water absorption of the recycled aggregate, and the performance of the recycled aggregates is improved in combination with microorganism mineralization at the crack defects of the recycled aggregates.

Beneficial effects: compared with the prior art, the present disclosure has the following obvious advantages: (1) the composite microbial powder of saccharomycetes and acetobacters is used, in which the saccharomycetes convert carbohydrate organic matters mixed in the recycled concrete into small molecular organic matters, the acetobacters further convert the small molecular organic matters into acid substances such as acetic acid, and the acid substances can peel off the mortar layer adhering to the surface of the recycled aggregates to reduce the water absorption of the recycled aggregate and improve the performance of the recycled aggregate; (2) the composite microbial powder of saccharomycetes and acetobacters is used to degrade carbohydrate organic matters, thereby solving the influence of this substance on the coagulating time and hardening strength of the recycled aggregate concrete; (3) the *Bacillus mucilaginosus* powder is loaded at the cracks of the recycled aggregates in vacuum, carbonate minerals are deposited at the cracks by spraying the calcium source solution to block the cracks of the recycled aggregates to further reduce the water absorption of the recycled aggregates by at least more than 50%, which is conducive to improving the strength of the recycled aggregates; (4) this method is low in cost, good in effect and is green environmental-friendly.

DETAILED DESCRIPTION OF THE EMBODIMENTS

Figure 1:
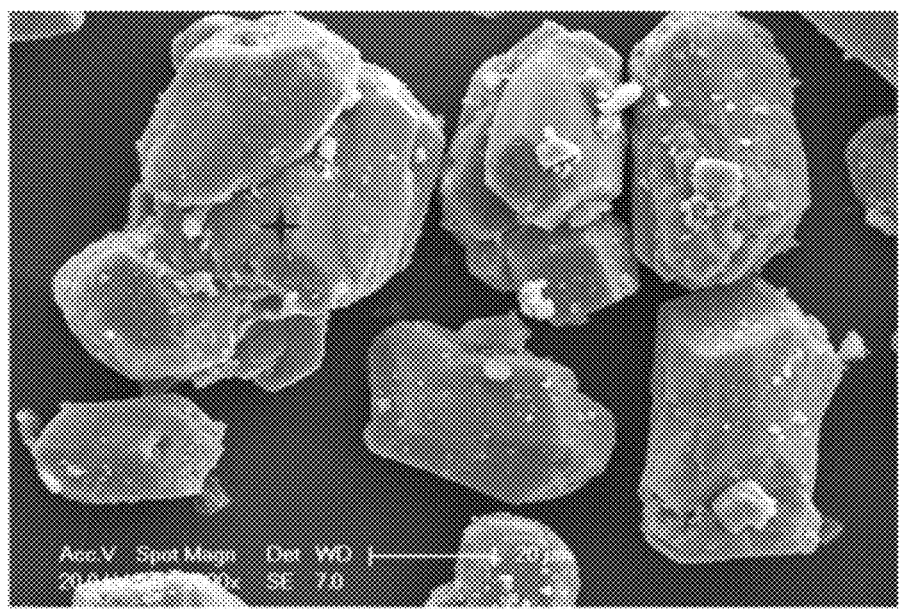
FIG. 1 is a scanning electron microscope (SEM) image of mineral at a crack.

Next, the technical solution of the present disclosure will be further described in combination with drawings.

Example 1

A method for improving the performance of concrete aggregates comprises the following steps:
(1) composite microbial powders, recycled aggregates and water were added into a stirring pot in a mass ratio of 1:5:5, wherein a mass ratio of saccharomycetes to acetobacters in the composite microbial powder was 1:1, a constant temperature was set as 20° C., the above materials were continuously stirred for 24 hours at a stirring speed of 20 r/min, and the obtained product stood for 120 hours to obtain recycled aggregate A;
(2) the recycled aggregate A was washed with deionized water and dried, the dried recycled aggregate A and microbial powder *Bacillus mucilaginosus* were placed in a vacuum device so as to fill the microbial powder into the cracks of the recycled aggregate in a negative-pressure environment to obtain recycled aggregate B, wherein a mass ratio of the microbial powder to the recycled aggregate was 1:10; and
(3) a calcium source solution was sprayed onto the surface of the recycled aggregate B at a spraying time interval of 6 hours for repeating 5 times in total to maintain the wet surface of the recycled aggregate, the environment temperature was maintained to a constant temperature of 30'C, and the obtained product stood for 120 hours.

Example 2

A method for improving the performance of concrete aggregates comprises the following steps:
(1) composite microbial powders, recycled aggregates and water were added into a stirring pot in a mass ratio of 1:8:8, wherein a mass ratio of saccharomycetes to acetobacters in the composite microbial powder was 1:2, a constant temperature was set as 20° C., the above materials were continuously stirred for 48 hours at a stirring speed of 30 r/min, and the obtained product stood for 120 hours to obtain recycled aggregate A;
(2) the recycled aggregate A was washed with deionized water and dried, the dried recycled aggregate A and microbial powder *Bacillus mucilaginosus* were placed in a vacuum device so as to fill the microbial powder into the cracks of the recycled aggregate in a negative-pressure environment to obtain recycled aggregate B, wherein a mass ratio of the microbial powder to the recycled aggregate was 1:12; and
(3) a calcium source solution was sprayed onto the surface of the recycled aggregate B at a spraying time interval of 6 hours for repeating 5 times in total to maintain the wet surface of the recycled aggregate, the environment temperature was maintained to a constant temperature of 30V, and the obtained product stood for 120 hours.

Example 3

A method for improving the performance of concrete aggregates comprises the following steps:
(1) composite microbial powders, recycled aggregates and water were added into a stirring pot in a mass ratio of 1:10:10, wherein a mass ratio of saccharomycetes to acetobacters in the composite microbial powder was 1:3, a constant temperature was set as 20° C., the above materials were continuously stirred for 40 hours at a stirring speed of 30 r/min, and the obtained product stood for 120 hours to obtain recycled aggregate A;
(2) the recycled aggregate A was washed with deionized water and dried, the dried recycled aggregate A and microbial powder *Bacillus mucilaginosus* were placed in a vacuum device so as to fill the microbial powder into the cracks of the recycled aggregate in a negative-pressure environment to obtain recycled aggregate B, wherein a mass ratio of the microbial powder to the recycled aggregate was 1:15; and
(3) a calcium source solution was sprayed onto the surface of the recycled aggregate B at a spraying time interval of 6 hours for repeating 5 times in total to maintain the wet surface of the recycled aggregate, the environment temperature was maintained to a constant temperature of 30° C., and the obtained product stood for 120 hours.

Figure 2:
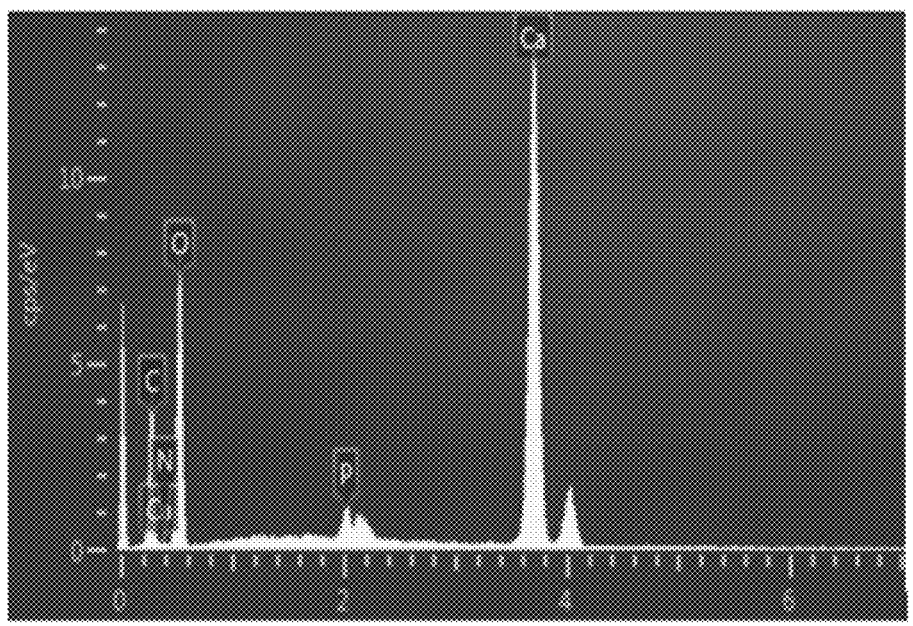
FIG. 2 is an energy dispersive spectrum (EDS) of mineral at a crack.
Figure 3:
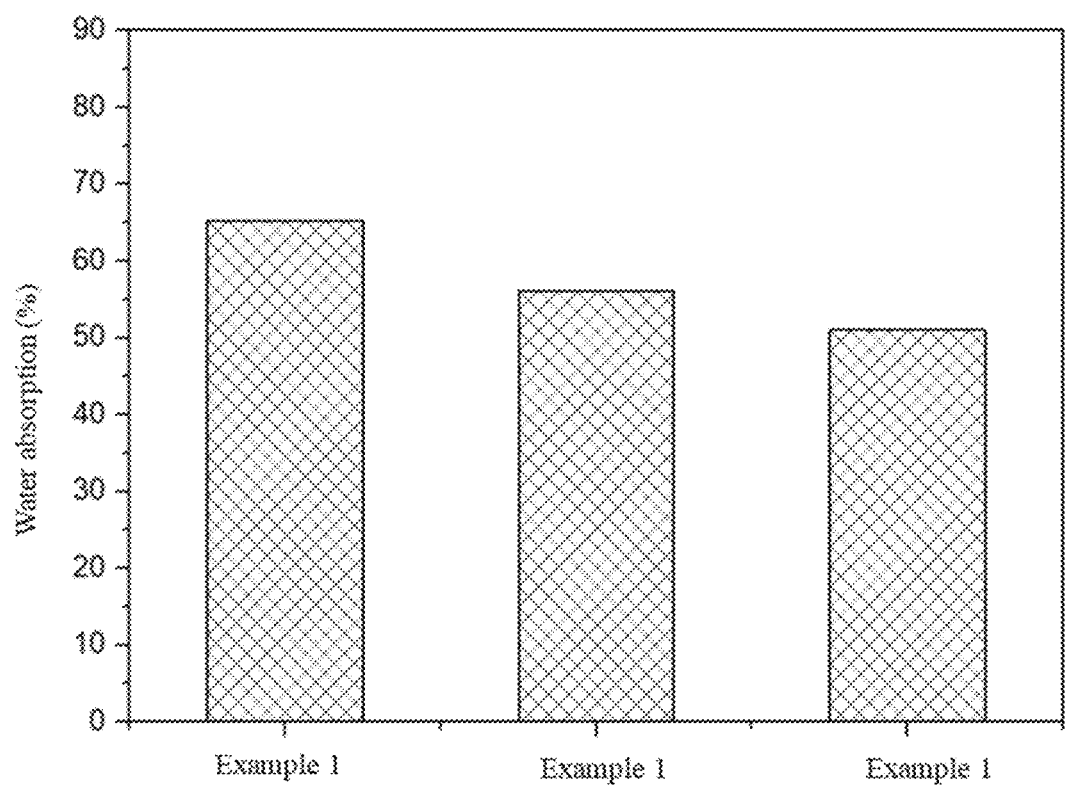
FIG. 3 is a water absorption picture of recycled aggregates.

FIG. 1 is an SEM image of mineral at a crack, and FIG. 2 is an EDS spectrum of mineral at a crack. It can be seen from FIG. 1 and FIG. 2 that calcium carbonate mineral is formed at the cracks of the recycled aggregate to fill and block the cracks: FIG. 3 shows water absorption of the finally obtained recycled aggregate. It can be FIG. 3 that the water absorption of the recycled aggregate finally obtained after being treated is greatly reduced by more than 50%, which improves the performance of the recycled aggregates.

What is claimed is:

1. A method for improving the performance of concrete aggregates mixed with carbohydrates, comprising the following steps:
S1. setting a constant temperature, continuously stirring composite microbial powders, recycled aggregates and water, and then standing to obtain recycled aggregate A, wherein the composite microbial powder is a mixture of saccharomycetes and acetobacters;
S2. washing the recycled aggregate A with deionized water, drying, placing the dried recycled aggregate A and another microbial powder in a vacuum device so as to fill the microbial powder into cracks of the recycled aggregate in a negative-pressure environment to obtain recycled aggregate B, wherein the microbial powder is *Bacillus mucilaginosus*; and
S3. spraying a calcium source solution onto the surface of the recycled aggregate B to maintain a wet surface of the recycled aggregate, keeping an environment temperature constant, and then standing.

2. The method for improving the performance of concrete aggregates mixed with carbohydrates according to claim 1, wherein a mass ratio of the saccharomycetes to the acetobacters is 1:1-1:3.

3. The method for improving the performance of concrete aggregates mixed with carbohydrates according to claim 1, wherein a mass ratio of the composite microbial powder to water to the recycled aggregate is 1:(5-10):(5-15).

4. The method for improving the performance of concrete aggregates mixed with carbohydrates according to claim 1, wherein in S1, the stirring time is 24-72 hours, and the stirring speed is 10-50 r/min.

5. The method for improving the performance of concrete aggregates mixed with carbohydrates according to claim 1, wherein in S1, and the constant temperature is 20-30° C.

6. The method for improving the performance of concrete aggregates mixed with carbohydrates according to claim 1, wherein in S1, the time of standing is 48-120 hours.

7. The method for improving the performance of concrete aggregates mixed with carbohydrates according to claim 1, wherein in S2, a mass ratio of the microbial powder to the recycled aggregate A is 1:10-1:15.

8. The method for improving the performance of concrete aggregates mixed with carbohydrates according to claim 1, wherein in S3, the calcium source solution is at least one of calcium chloride, calcium nitrate or calcium lactate.

9. The method for improving the performance of concrete aggregates mixed with carbohydrates according to claim 1, wherein in S3, a spraying time interval of the calcium source solution is 5-6 hours, repetition times of spraying is 3-5 times, and time of standing is 48-120 hours.

\* \* \* \* \*